United States Patent
Chae et al.

(10) Patent No.: US 11,132,995 B2
(45) Date of Patent: Sep. 28, 2021

(54) ARTIFICIAL INTELLIGENCE SERVER FOR SETTING LANGUAGE OF ROBOT AND METHOD FOR THE SAME

(71) Applicant: LG ELECTRONICS INC., Seoul (KR)

(72) Inventors: Jonghoon Chae, Seoul (KR); Taehyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 209 days.

(21) Appl. No.: 16/560,763

(22) Filed: Sep. 4, 2019

(65) Prior Publication Data

US 2019/0392820 A1 Dec. 26, 2019

(30) Foreign Application Priority Data

Aug. 5, 2019 (KR) .......................... 10-2019-0095079

(51) Int. Cl.
*G10L 15/00* (2013.01)
*G10L 15/183* (2013.01)
(Continued)

(52) U.S. Cl.
CPC ............. *G10L 15/183* (2013.01); *B25J 9/163* (2013.01); *B25J 13/003* (2013.01); *G05D 1/0016* (2013.01); *G05D 1/0088* (2013.01); *G05D 1/0221* (2013.01); *G06N 3/04* (2013.01); *G06N 3/08* (2013.01); *G10L 15/005* (2013.01);
(Continued)

(58) Field of Classification Search
CPC ......... G06F 40/263; G06F 40/35; G10L 15/22
See application file for complete search history.

(56) References Cited

U.S. PATENT DOCUMENTS

| 5,758,023 A | * | 5/1998 | Bordeaux | ............... G10L 15/16 704/232 |
| 5,805,771 A | * | 9/1998 | Muthusamy | .......... G10L 15/005 704/231 |

(Continued)

FOREIGN PATENT DOCUMENTS

| JP | 2018169788 | 11/2018 |
| KR | 20100004852 | 1/2010 |
| KR | 20190040656 | 4/2019 |

OTHER PUBLICATIONS

Korean Intellectual Property Office Application Serial No. 10-2019-0095079, Office Action dated Dec. 27, 2020, 6 pages.

*Primary Examiner* — Daniel Abebe
(74) *Attorney, Agent, or Firm* — Lee, Hong, Degerman, Kang & Waimey

(57) ABSTRACT

An artificial intelligence server for setting a language of a robot includes a communication unit and a processor. The communication unit is configured to communicate with the robot. The processor is configured to receive voice data for a control area from the robot, generate first language distribution information using the received voice data, receive event information for the control area, generate second language distribution information using the received event information, determine at least one major output language for the robot based on the generated first language distribution information and the generated second language distribution information, and transmit a control signal for setting the determined major output language to the robot.

14 Claims, 10 Drawing Sheets

(51) Int. Cl.
*G10L 15/22* (2006.01)
*G10L 15/30* (2013.01)
*G06N 3/04* (2006.01)
*G05D 1/02* (2020.01)
*G05D 1/00* (2006.01)
*B25J 9/16* (2006.01)
*B25J 13/00* (2006.01)
*G06N 3/08* (2006.01)
*H04L 29/08* (2006.01)

(52) U.S. Cl.
CPC .............. *G10L 15/22* (2013.01); *G10L 15/30* (2013.01); *H04L 67/10* (2013.01)

(56) References Cited

U.S. PATENT DOCUMENTS

| | | | | |
|---|---|---|---|---|
| 6,061,646 A | * | 5/2000 | Martino | G06F 40/263 |
| | | | | 704/3 |
| 2008/0294424 A1 | * | 11/2008 | Naito | G06Q 30/02 |
| | | | | 704/8 |
| 2008/0300880 A1 | * | 12/2008 | Gelbman | G06Q 20/20 |
| | | | | 704/256 |

* cited by examiner

ARTIFICIAL INTELLIGENCE SERVER FOR SETTING LANGUAGE OF ROBOT AND METHOD FOR THE SAME

CROSS-REFERENCE TO RELATED APPLICATIONS

Pursuant to 35 U.S.C. § 119(a), this application claims the benefit of earlier filing date and right of priority to Korean Patent Application No. 10-2019-0095079, filed on Aug. 5, 2019, the contents of which are hereby incorporated by reference herein in its entirety.

BACKGROUND

The present invention relates to an artificial intelligence server for setting a language of a robot and a method for the same. Specifically, the present invention relates to an artificial intelligence server for setting a language of a robot deployed in a control area based on a language used by a crowd in the control area, and a method for the same.

Recently, with the explosive growth of airport users and efforts to leap to smart airports, methods for providing services through artificial intelligence robots in airports or multiplexes are being discussed.

In a case in which artificial intelligence robots are introduced at airports or multiplexes, it is expected that robots can take on the unique role of human beings, which traditional computer systems could not replace, thereby contributing to the quantitative and qualitative improvement of provided services.

Artificial intelligence robots can perform various operations such as informing the users of directions at airports and various places where a lot of people gather.

However, since the artificial intelligence robot sequentially uses one or more languages preset in an idle state, the artificial intelligence robot does not take into account a language used by a user located nearby.

SUMMARY

The present invention is directed to provide an artificial intelligence server for setting a major output language of a robot based on languages used by users in a control area, and a method for the same.

In addition, the present invention is directed to provide an artificial intelligence server for setting a major output language of a robot, considering the distribution of languages used by real users and the distribution of language expected to be used by users, and a method for the same.

One embodiment of the present invention provides an artificial intelligence server and a method for the same, wherein the artificial intelligence server receives voice data and event information for a control area, generates first language distribution information using the received voice data, generates second language distribution information using the received event information, determines one or more major output languages using the generated first language distribution information and the generated second language distribution information, and transmits a control signal for setting the determined major output language to the robot.

In addition, one embodiment of the present invention provides an artificial intelligence server and a method for the same, wherein the artificial intelligence server recognizes voice from voice data using a language recognition model corresponding to each of a plurality of languages, and generates first language distribution information based on the number of words successfully recognized for each language.

In addition, one embodiment of the present invention provides an artificial intelligence server and a method for the same, wherein the artificial intelligence server generates second language distribution information using event information and user information corresponding to an event included in the event information.

Furthermore, one embodiment of the present invention provides an artificial intelligence server and a method for the same, wherein the artificial intelligence server determines a predetermined number as a major output language in the order of languages determined to be frequently used by users among a plurality of languages.

Furthermore, one embodiment of the present invention provides an artificial intelligence server and a method for the same, wherein the artificial intelligence server determines, as a major output language, languages of which a language distribution value considering first language distribution information and second language distribution information exceed a predetermined reference value among a plurality of languages.

The details of one or more embodiments are set forth in the accompanying drawings and the description below. Other features will be apparent from the description and drawings, and from the claims.

DETAILED DESCRIPTION OF THE EMBODIMENTS

Figure 1:
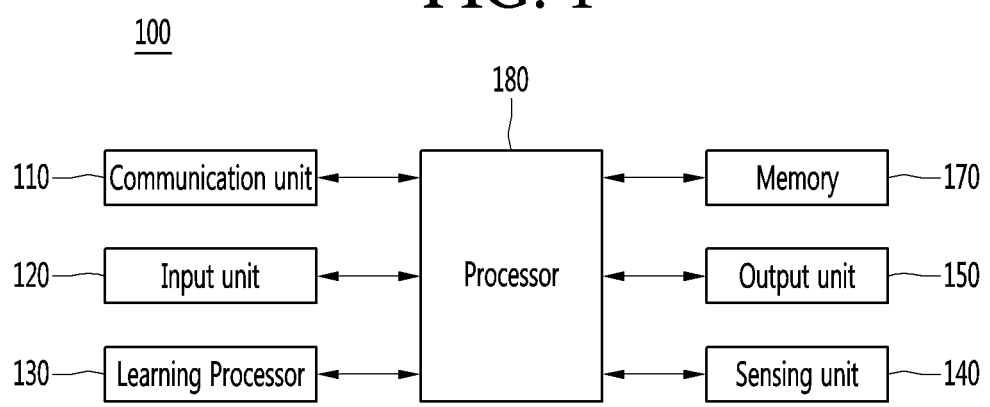
FIG. 1 is a block diagram illustrating an AI apparatus according to an embodiment of the present invention.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Artificial Intelligence (AI)

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

Robot

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

Self-Driving

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

Here, the self-driving vehicle may be regarded as a robot having a self-driving function.

eXtended Reality (XR)

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment of the present invention.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication unit 110, an input unit 120, a learning processor 130, a sensing unit 140, an output unit 150, a memory 170, and a processor 180.

The communication unit 110 may transmit and receive data to and from external devices such as other 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™ RFID (Radio Frequency Identification), Infrared Data Association (IrDA), ZigBee, NFC (Near Field Communication), and the like.

The input unit 120 may acquire various kinds of data.

Here, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a training data for model learning and an input data to be used when an output is acquired by using learning model. The input unit 120 may acquire raw input data. Here, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

Here, the learning processor 130 may perform AI processing together with the learning processor 240 of the AI server 200.

Here, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing unit 140 may acquire at least one of internal information about the AI apparatus 100, ambient environment information about the AI apparatus 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

Here, the output unit 150 may include a display unit for outputting time information, a speaker for outputting auditory information, and a haptic module for outputting haptic information.

The memory 170 may store data that supports various functions of the AI apparatus 100. For example, the memory 170 may store input data acquired by the input unit 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
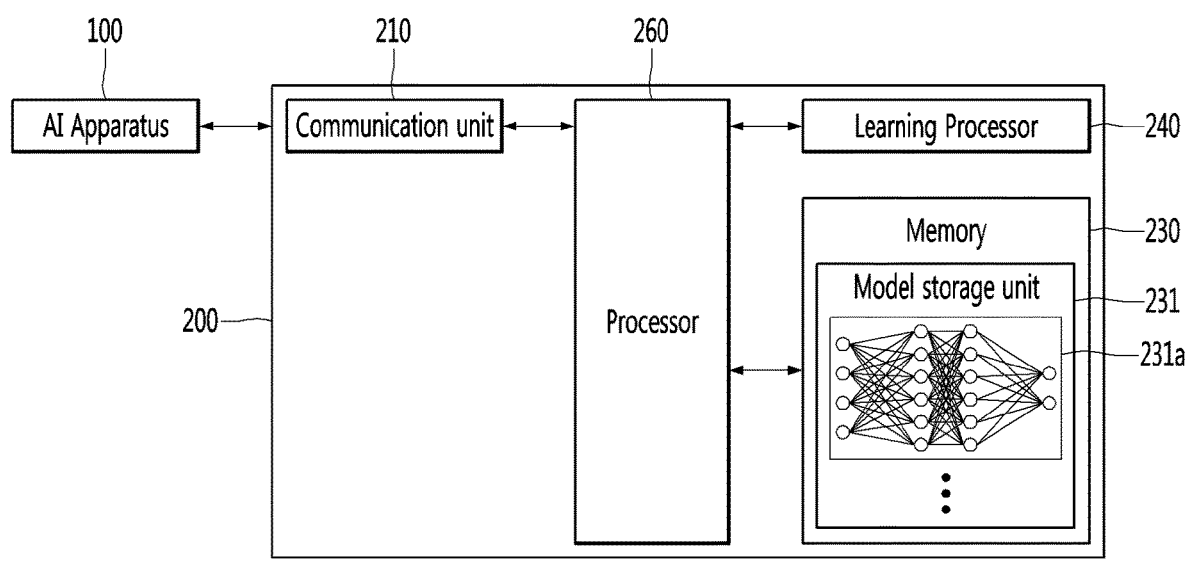
FIG. 2 is a block diagram illustrating an AI server according to an embodiment of the present invention.

FIG. 2 is a block diagram illustrating an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. Here, the AI server 200 may be included as a partial configuration of the AI apparatus 100, and may perform at least part of the AI processing together.

The AI server 200 may include a communication unit 210, a memory 230, a learning processor 240, a processor 260, and the like.

The communication unit 210 can transmit and receive data to and from an external device such as the AI apparatus 100.

The memory 230 may include a model storage unit 231. The model storage unit 231 may store a learning or learned model (or an artificial neural network 231*a*) through the learning processor 240.

The learning processor 240 may learn the artificial neural network 231*a* by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
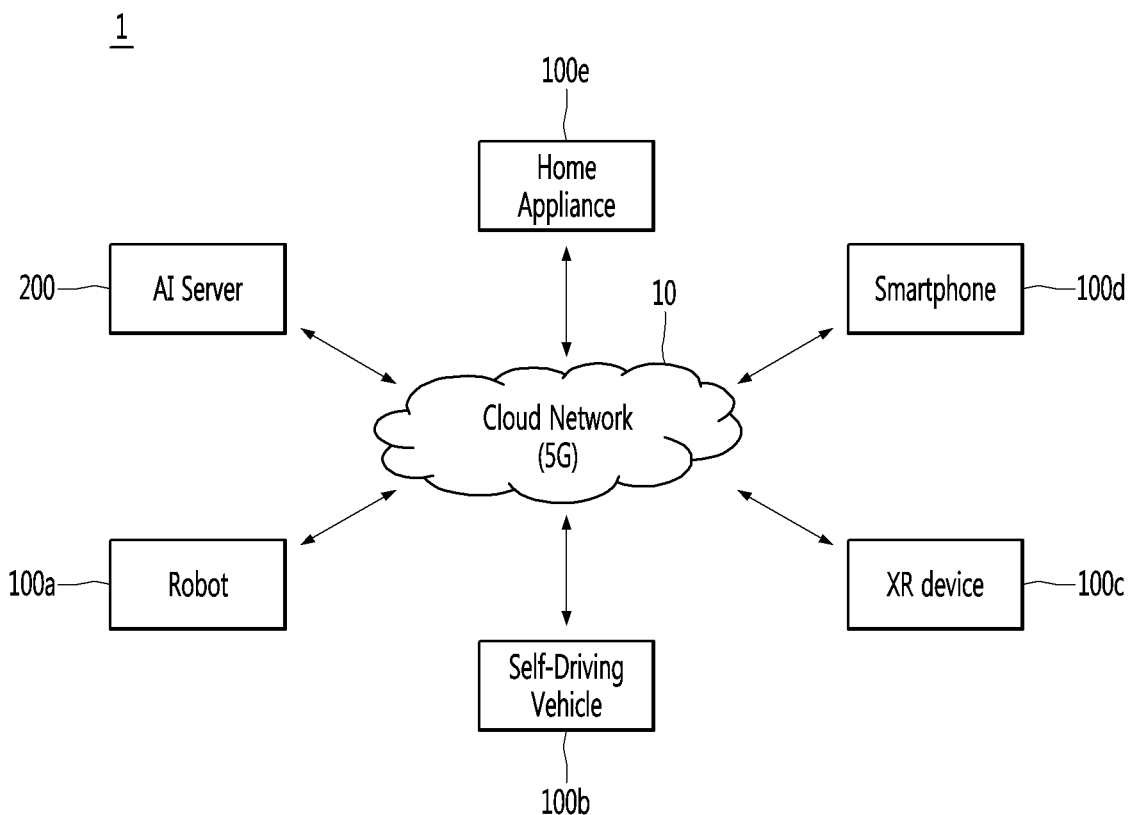
FIG. 3 is a view illustrating an AI system according to an embodiment of the present invention.

FIG. 3 is a view illustrating an AI system 1 according to an embodiment of the present invention.

Referring to FIG. 3, in the AI system 1, at least one of an AI server 200, a robot 100*a*, a self-driving vehicle 100*b*, an XR device 100*c*, a smartphone 100*d*, or a home appliance 100*e* is connected to a cloud network 10. The robot 100*a*, the self-driving vehicle 100*b*, the XR device 100*c*, the smartphone 100*d*, or the home appliance 100*e*, to which the AI technology is applied, may be referred to as AI apparatuses 100*a* to 100*e*.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100*a* to 100*e* and 200 configuring the AI system 1 may be connected to each other through the cloud network 10. In particular, each of the devices 100*a* to 100*e* and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100*a*, the self-driving vehicle 100*b*, the XR device 100*c*, the smartphone 100*d*, or the home appliance 100*e* through the cloud network 10, and may assist at least part of AI processing of the connected AI apparatuses 100*a* to 100*e*.

Here, the AI server 200 may learn the artificial neural network according to the machine learning algorithm instead of the AI apparatuses 100*a* to 100*e*, and may directly store the learning model or transmit the learning model to the AI apparatuses 100*a* to 100*e*.

Here, the AI server 200 may receive input data from the AI apparatuses 100*a* to 100*e*, may infer the result value for the received input data by using the learning model, may generate a response or a control command based on the inferred result value, and may transmit the response or the control command to the AI apparatuses 100*a* to 100*e*.

Alternatively, the AI apparatuses 100*a* to 100*e* may infer the result value for the input data by directly using the learning model, and may generate the response or the control command based on the inference result.

Hereinafter, various embodiments of the AI apparatuses 100*a* to 100*e* to which the above-described technology is applied will be described. The AI apparatuses 100*a* to 100*e* illustrated in FIG. 3 may be regarded as a specific embodiment of the AI apparatus 100 illustrated in FIG. 1.

AI+Robot

The robot 100*a*, to which the AI technology is applied, may be implemented as a guide robot, a carrying robot, a cleaning robot, a wearable robot, an entertainment robot, a pet robot, an unmanned flying robot, or the like.

The robot 100*a* may include a robot control module for controlling the operation, and the robot control module may refer to a software module or a chip implementing the software module by hardware.

The robot 100*a* may acquire state information about the robot 100*a* by using sensor information acquired from various kinds of sensors, may detect (recognize) surrounding environment and objects, may generate map data, may determine the route and the travel plan, may determine the response to user interaction, or may determine the operation.

The robot 100*a* may use the sensor information acquired from at least one sensor among the lidar, the radar, and the camera so as to determine the travel route and the travel plan.

The robot 100*a* may perform the above-described operations by using the learning model composed of at least one artificial neural network. For example, the robot 100*a* may recognize the surrounding environment and the objects by using the learning model, and may determine the operation by using the recognized surrounding information or object information. The learning model may be learned directly from the robot 100*a* or may be learned from an external device such as the AI server 200.

Here, the robot 100*a* may perform the operation by generating the result by directly using the learning model, but the sensor information may be transmitted to the external device such as the AI server 200 and the generated result may be received to perform the operation.

The robot 100*a* may use at least one of the map data, the object information detected from the sensor information, or the object information acquired from the external device to determine the travel route and the travel plan, and may control the driving unit such that the robot 100*a* travels along the determined travel route and travel plan.

The map data may include object identification information about various objects arranged in the space in which the robot 100*a* moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. Here, the robot 100a may acquire the intention information of the interaction due to the user's operation or speech utterance, and may determine the response based on the acquired intention information, and may perform the operation.

AI+Self-Driving

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling route by using the recognized surrounding information or object information. The learning model may be learned directly from the self-driving vehicle 100a or may be learned from an external device such as the AI server 200.

Here, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external device to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. Here, the self-driving vehicle 100b may acquire the intention information of the interaction due to the user's operation or speech utterance, and may determine the response based on the acquired intention information, and may perform the operation.

AI+XR

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

Here, the XR device 100c may perform the operation by generating the result by directly using the learning model, but the sensor information may be transmitted to the external device such as the AI server 200 and the generated result may be received to perform the operation.

AI+Robot+Self-Driving

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given route without the user's control or moves for itself by determining the route by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

Here, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

AI+Robot+XR

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

AI+Self-Driving+XR

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

Here, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
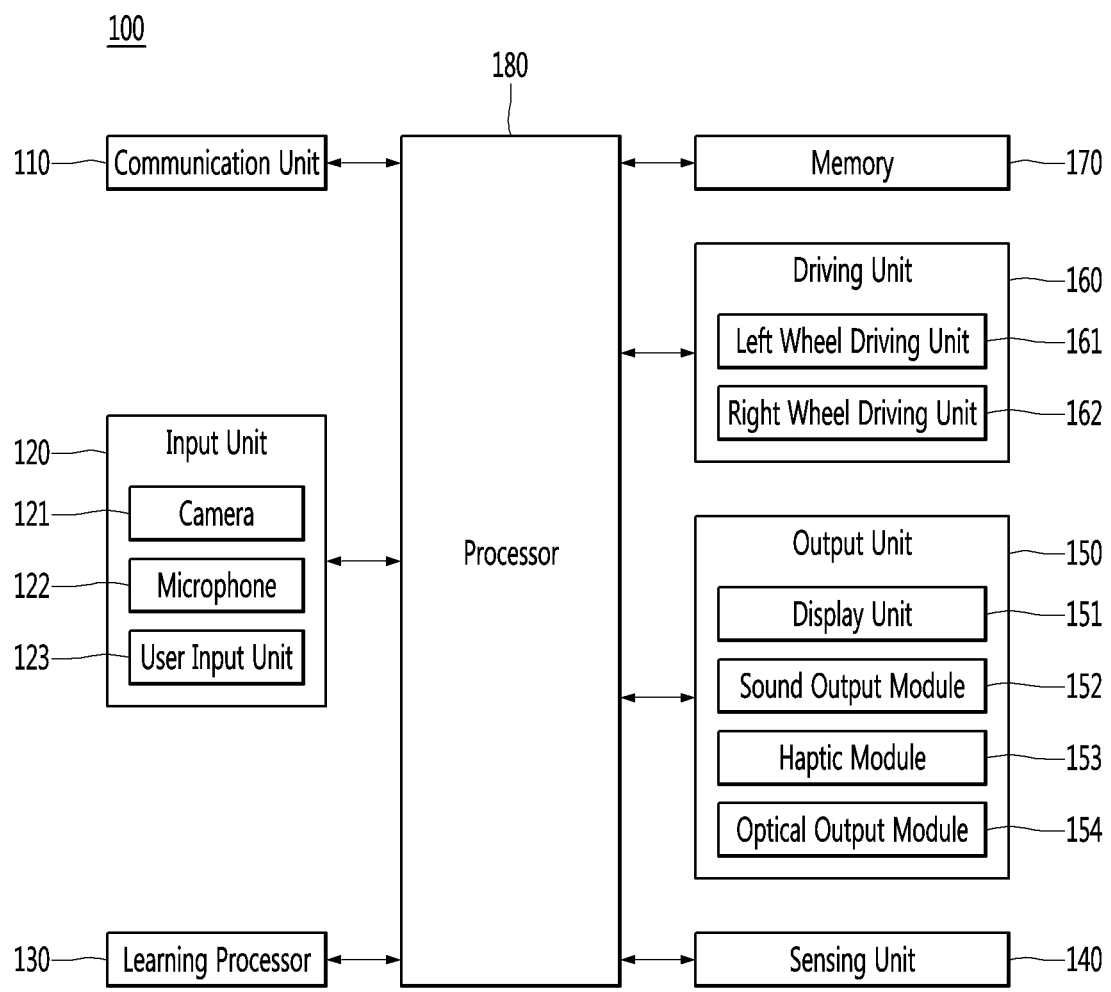
FIG. 4 is a block diagram illustrating an AI apparatus according to an embodiment of the present invention.

FIG. 4 is a block diagram illustrating an AI apparatus 100 according to an embodiment of the present invention.

The redundant repeat of FIG. 1 will be omitted below.

Hereinafter, the AI apparatus 100 may be referred to as an AI robot 100, and the terms "AI apparatus" and "AI robot" may be used as the same meaning unless otherwise distinguished.

Referring to FIG. 4, the AI robot 100 may further include a driving unit 160.

The input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information inputted from a user and the AI apparatus 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the AI apparatus 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the AI apparatus 100 to correspond to the inputted information.

The user input unit 123 may include a mechanical input means (or a mechanical key, for example, a button, a dome switch, a jog wheel, and a jog switch at the front, back or side of the AI apparatus 100) and a touch type input means. As one example, a touch type input means may include a virtual key, a soft key, or a visual key, which is displayed on a touch screen through software processing or may include a touch key disposed at a portion other than the touch screen.

The sensing unit 140 may also be referred to as a sensor unit.

The output unit 150 may include at least one of a display unit 151, a sound output module 152, a haptic module 153, or an optical output module 154.

The display unit 151 may display (output) information processed in the AI apparatus 100. For example, the display unit 151 may display execution screen information of an application program running on the AI apparatus 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the AI apparatus 100 and a user, and an output interface between the AI apparatus 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI apparatus 100. An example of an event occurring in the AI apparatus 100 includes message reception, call signal reception, missed calls, alarm, schedule notification, e-mail reception, and information reception through an application.

The driving unit 160 may move the AI robot 100 in a specific direction or by a specific distance.

The driving unit 160 may include a left wheel driving unit 161 for driving a left wheel of the AI robot 100 and a right wheel driving unit 162 for driving a right wheel of the AI robot 100.

The left wheel driving unit 161 may include a motor for driving the left wheel, and the right wheel driving unit 162 may include a motor for driving the right wheel.

In FIG. 4, an example in which the driving unit 160 includes the left wheel driving unit 161 and the right wheel driving unit 162 has been described, but the present invention is not limited thereto. That is, in one embodiment, the driving unit 160 may include only one wheel, or may include three or more wheels.

Figure 5:
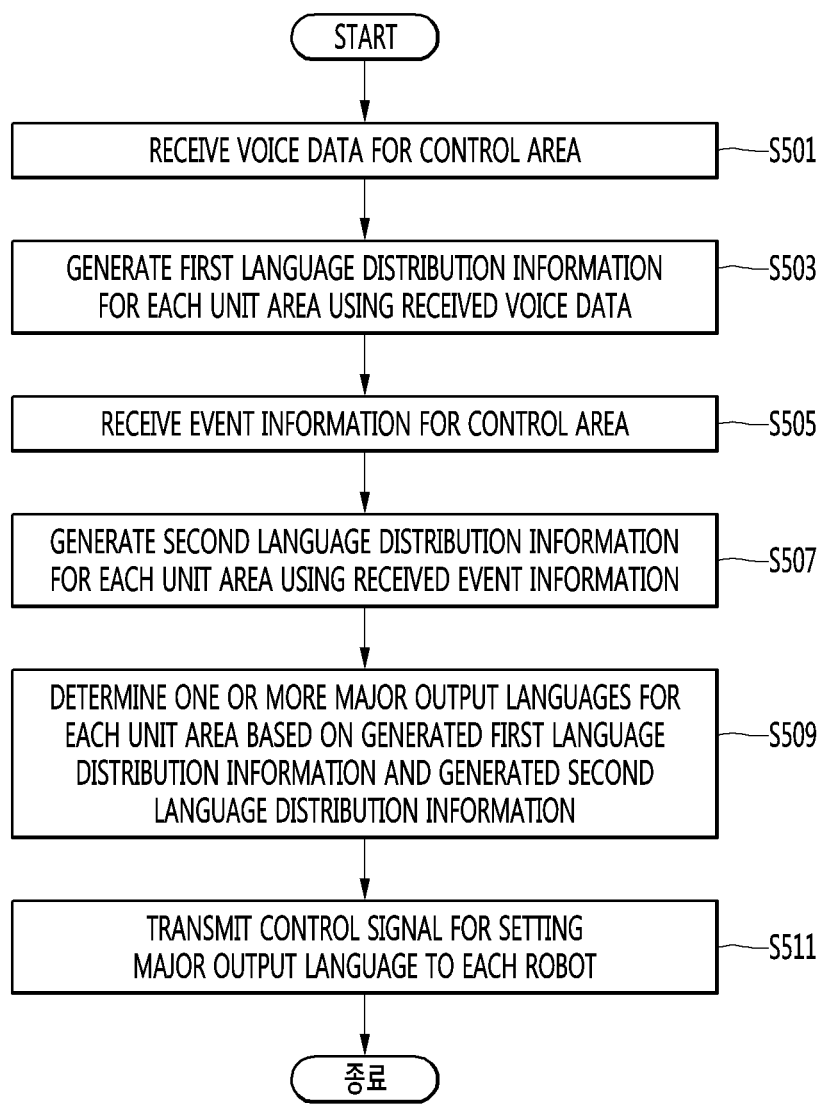
FIG. 5 is a flowchart illustrating a method for setting a language of a robot according to an embodiment of the present invention.

FIG. 5 is a flowchart illustrating a method for setting a language of a robot according to an embodiment of the present invention.

The AI server 200 may communicate with at least one robot or AI robot 100, and the AI server 200 may determine the route of the robot or AI robot 100.

That is, the AI server 200 may determine at least one route from a general robot having no AI function and the AI robot 100 having the AI function.

Hereinafter, unless otherwise specified, the robot includes an AI robot 100.

Here, the AI server 200 may be a server constituting a control system for controlling at least one robot disposed in an airport or a building. The AI server 200 may control at least one robot.

Referring to FIG. 5, the processor 260 of the AI server 200 receives voice data for a control area (S501).

The control area may mean an entire area in which the AI server 200 provides a guidance service using robots, or may be referred to as an entire area. That is, the AI server 200 may determine the operation, the route, and the deployment area of the robot within the control area.

That is, the control area may mean the maximum activity range of the robot.

The control area may include a plurality of unit areas, and each of the unit areas may be set to a predetermined shape and size.

Here, each unit area may have a rectangular or square shape, but the present invention is not limited thereto.

Here, the areas of the respective unit areas may be the same, but the present invention is not limited thereto.

The memory 230 of the AI server 200 may store location information indicating the location of each of the plurality of unit areas. The location information may be coordinates of the unit area.

The deployment area corresponding to the robot may mean a range in which the robot performs an operation. That is, each of the robots may move within its own deployment area and provide a service to users.

The deployment area may be composed of at least one unit area.

Here, the processor 260 may receive, via the communication unit 210, voice data collected from a plurality of robots.

That is, each of the plurality of robots may use a microphone to receive the voice of the user input in the unit area where the robot is located, and transmit voice data for the received voice to the AI server 200.

Also, the processor 260 may further receive, via the communication unit 210, voice data uttered by users, collected in at least one unit area, from at least one microphone installed in the control area.

The received voice data may include only a single user's voice, or may include voice of a plurality of users.

Here, the processor 260 may also receive, via the communication unit 210, location information about the robot or the microphone that has transmitted the voice data. That is, the processor 260 may identify which voice data is collected and where the voice data is collected, by using the received location information.

The processor 260 of the AI server 200 generates first language distribution information for each unit area using voice data.

Here, the first language distribution information may include information about language distribution for each unit area. That is, even if not called first language distribution information for each unit area, the language distribution information divided for each unit area may be included in the first language distribution information itself.

The processor 260 may receive a plurality of pieces of voice data and corresponding location information from the robot or the microphone, and the processor 260 may classify or divide the received voice data for each unit area included in the control area.

The processor 260 may generate first language distribution information by analyzing a distribution of languages included in language data for each unit area by using voice data classified for each unit area.

The language distribution may mean a distribution by type of language.

For example, the first language distribution information may be expressed as a distribution ratio between the respective languages, such as Korean 60%, English 30%, and Japanese 10%, or may be expressed by the number of users who speak the respective languages, such as six Korean users, three English users, and one Japanese user.

The distribution ratio between languages may refer to a ratio of numbers of users who use the respective languages, or may refer to a language distribution for each word included in voice data.

Here, the processor 260 may determine the number of users who use the respective languages and generate first language distribution information based on the determined number.

Here, the processor 260 may determine a volume of voice corresponding to each language and generate first language distribution information based on a ratio of the magnitude of the voice corresponding to each language.

Here, the processor 260 may measure the confidence level of the voice data using a voice model corresponding to each language, and generate first language distribution information based on the measured ratio of the confidence level.

The processor 260 of the AI server 200 receives the event information for the control area (S505).

The event information for the control area is information for various events related to the control area, and may include event identification information, event location information, event start time information, event end time information, event type information, event delay information, and the like.

For example, if the control area is a transportation hub such as an airport, a bus terminal, or a train station, the event information for the control area includes at least one of route information, gate information, departure time information, arrival time information, or delay information about transportation, including airplanes, buses, and trains.

For example, if the control area is an entertainment space (or multiplex) such as a concert hall, a stadium, or a movie theater, recognition information for the control area may include at least one of event schedule information, event gate information, event start time information, event end time information, or delay information in the control area.

Here, the processor 260 of the AI server 200 may further receive user information for an event that is progressing or to be held in the control area.

The user information for the event may include at least one of user's reservation information for the event or participation information of the user who participated in the real event.

For example, if the control area is an airport, the user information for the event may include at least one of reservation information of users about a specific flight or boarding information of users (or passengers) about a real flight. The reservation information of the users or the boarding information of the users may include nationality information of the corresponding users, or may include language information used by the corresponding users.

For example, if the control area is a sports arena, the user information for the event may include at least one of reservation information of users for a specific sporting event or participation information of users (or spectators) who have actually come to watch the sporting event. The reservation information of the users or the participation information of the users may include nationality information of the users, or may include language information used by the users.

The boarding information or viewing information of the users may be referred to as usage information of users (or user usage information), and the processor 260 may obtain the usage information of the users in conjunction with an event reservation system for the corresponding control area.

The nationality information or language information of the users may be determined according to a nationality set in the user's account used while the user performs the action for reserving the schedule, an address set in an account, language information set in the user's terminal, a billing address used when the user makes a payment, and a type of currency used for payment.

As such, the processor 260 may obtain an expected value for the language distribution of the users related to the event proceeding in the control area by using the user information for the event proceeding in the control area.

Here, the processor 260 may map event information for the control area to each unit area included in the control area by using the spatial information for the control area.

The processor 260 of the AI server 200 generates second language distribution information for each unit area by using the received event information (S507).

The second language distribution information may mean an expected value of a distribution for a language mainly used by users, which is predicted or expected from the event information.

Here, the second language distribution information may include information about language distribution for each unit area. That is, even if not called second language distribution information for each unit area, the language distribution information divided for each unit area may be included in the second language distribution information itself.

For example, if the control area is Incheon International Airport in Korea, and according to the event information, an airplane departing from Haneda International Airport in Japan arrives at the first gate, the processor 260 may generate second language distribution information in which the expected language distribution is set to have a high ratio of Korean and Japanese for the unit areas corresponding to the first gate.

Here, the processor 260 may generate the second language distribution information for each unit area by using not only the received event information but also user information for an event proceeding in the control area.

For example, if the control area is an airport, the user information for the event may include reservation information or boarding information of users about a specific aircraft route as described above, and the processor 260 may generate the second language distribution information based on the reservation information or boarding information of the users.

For example, if it is determined that 150 Koreans, 40 Americans, and 10 Japanese are on a particular aircraft, the second language distribution information may be expressed as a ratio of the respective languages, such as Korean 75%, English 20%, and Japanese 5%, or may be expressed as the number of users who speak the respective languages, such as 150 Korean users, 40 English users, and 10 Japanese users.

The processor 260 of the AI server 200 determines one or more major output languages for each unit area based on the generated first language distribution information and the generated second language distribution information (S509).

The major output language may refer to a language mainly used by robots.

The first language distribution information is information about a language distribution generated based on actually collected voice data, and the second language distribution information is information about a language distribution generated based on user information for the event in the control area. Therefore, the first language distribution information may indicate a distribution of languages used by users who speak in the real control area, and the second language distribution information may indicate a distribution of languages including users who do not speak.

Here, the processor 260 weighted-sums the first language distribution information and the second language distribution information based on a preset weight, and one or more major output languages may be determined for each unit area based on the weighted-sum language distribution information.

The weighted sum of the language distribution information may mean weighted-summing the distribution ratio of the respective languages or the user ratio of the respective languages included in the language distribution information.

For example, if the language distribution according to the first language distribution information is (Korean, English, Japanese)=(0.5, 0.3, 0.2), the language distribution according to the second language distribution information is (Korean, English, Japanese)=(0.7, 0.2, 0.1), and the weight between the first language distribution information and the second language distribution is (0.5, 0.5), the language distribution according to the weighted-sum language distribution information may be (Korean, English, Japanese)= (0.6, 0.25, 0.15).

Here, the processor 260 may rank the respective languages based on the weighted-sum language distribution information, and determine a predetermined number of languages as the major output language.

For example, if the number of preset output languages is 2 and the language distribution according to the weighted-sum language distribution information is (Korean, English, Japanese)=(0.6, 0.25, 0.15), the processor 260 may determine Korean and English as the major output languages.

Here, the processor 260 may determine, as the major output language, languages in which the ratio of the total language exceeds a predetermined reference value among the languages included in the weighted-sum language distribution information.

For example, if the predetermined reference value is 0.2 and the language distribution according to the weighted-sum language distribution information is (Korean, English, Japanese)=(0.6, 0.25, 0.15), the processor 260 may determine Korean and English as the main output language.

Also, even if the weighted-sum language distribution information is expressed as the number of users who use the respective languages, the processor 260 may determine the ratio of the total languages based on the ratio of the users of the languages, and determine the major output language by comparing the determined ratio with the predetermined reference value.

For example, if the predetermined reference value is 0.2 and the number of users in the respective languages according to the weighted-sum language distribution is (Korean, English, Japanese)=(140, 50, 10), the processor 260 may determine the user ratio of the respective languages as (0.7, 0.25, 0.05), and thus determine Korean and English as the major output languages.

The processor 260 of the AI server 200 transmits, via the communication unit 210, a control signal for setting the major output language to the respective robots (S511).

The processor 260 may determine the major output languages corresponding to the respective robots based on the information for the deployment areas of the respective robots and the major output language determined for each unit area. The processor 260 may transmit, via the communication unit 210, the control signal for setting the major output languages determined for the respective robots.

Information for the deployment area of each robot may be obtained by being received from each robot through the communication unit 210, or may be obtained by loading information for the deployment area of each robot, which is stored in the memory 230.

Here, the control signal for setting the major output language may be a control signal for outputting only the languages determined as the major output languages, or may be a control signal for outputting the languages determined as the major output languages at a higher frequency than that of languages that are not determined.

Users who use different languages may exist in the control area. Therefore, if only the language that many people are expected to use is output, users who use a few different languages may have difficulty in interacting with robots. Therefore, since the robot also needs to output a language that is not set as the major output language, the AI server 200 may control the robots to output the language set as the major output language more frequently than the language not set as the major output language.

Further, the processor 260 of the AI server 200 may perform a control to update the operation or the deployment area of the robot in consideration of the distribution of users in the control area as well as the major output language.

Therefore, the AI server 200 may control the robots deployed in the control area to provide a service based on a language that is frequently used by people located in the control area. In particular, the robot in the idle state notifies users that services can be provided to users by outputting various languages sequentially. Services can be provided more smoothly by adjusting the type or frequency of the output language in consideration of the languages used by the user in the space where the robot is deployed.

In one embodiment, steps S501 and S503 for generating the first language distribution information and steps S505 and S507 for generating the second language distribution information may be performed in parallel.

Figure 6:
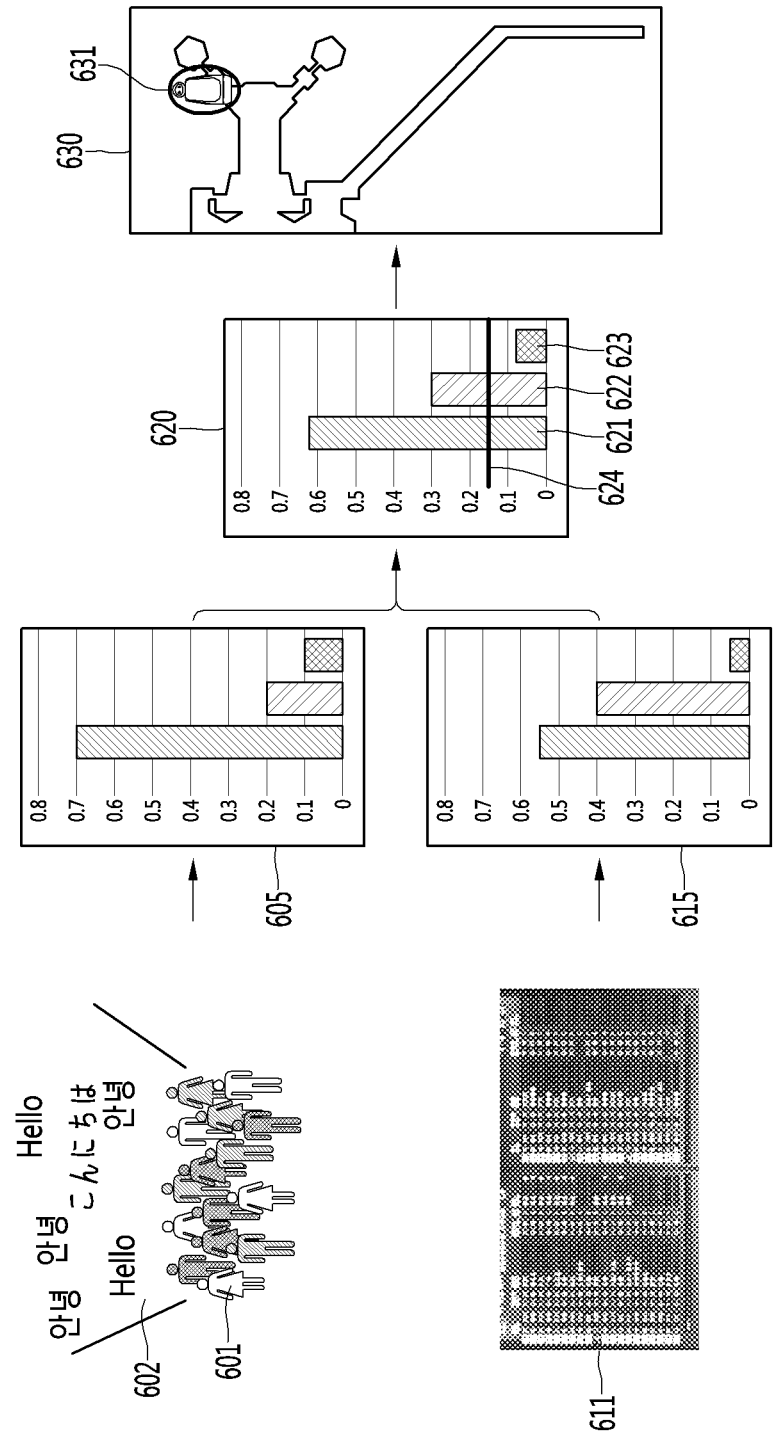
FIG. 6 is a view illustrating a method for setting an output language of a robot according to an embodiment of the present invention.

In one embodiment, steps S505 and S507 for generating the second language distribution information may be first performed, and steps S501 and S503 for generating the first language distribution information may be then performed FIG. 6 is a view illustrating a method for setting an output language of a robot according to an embodiment of the present invention.

Referring to FIG. 6, the processor 260 of the AI server 200 may receive voice data corresponding to voice 602 of users 601 (or crowd) from a robot 631 deployed in a control area 630.

The voice 602 of the users 601 may include various languages.

The processor 260 of the AI server 200 may generate first language distribution information 605 using the received voice data.

For example, as described above, the processor 260 may attempt to recognize voice using a plurality of language recognition models for the voice data, and generate the first language distribution information 605 based on a ratio of the number of words successfully recognized when each language recognition model is used.

The language recognition model may refer to a voice recognition model, and may be an artificial neural network-based model learned by using a machine learning algorithm or a deep learning algorithm.

Also, the processor 260 of the AI server 200 may receive event information 611 about the control area 630.

The event information 611 may include event schedule information, event start time information, event end time information, event delay information, and event location information related to the control area.

The processor 260 of the AI server 200 may generate second language distribution information 615 using the received event information 611.

For example, as described above, the processor 260 may determine a distribution of users who use the languages by using traffic route information included in the event information 611, and generate the second language distribution information 615 based on the determined distribution.

Also, the processor 260 may generate the second language distribution information by using the event information 611 and the user information for the event together. The user information may include at least one of reservation information of users or participation information of users.

The processor 260 of the AI server 200 may determine the major output language using the first language distribution information 605 and the second language distribution information 615.

For example, the processor 260 may weighted-sum the first language distribution information 605 and the second language distribution information 615 to generate the weighted-sum language distribution information 620, and determine the major output language based on whether the ratio of the respective languages 621, 622, and 623 to the entire languages exceeds a reference value 624. That is, the processor 260 may determine, as the major output language, the first language 621 and the second language 622 whose ratio to the entire languages exceeds the reference value 624.

The processor 260 of the AI server 200 may transmit a control signal for setting the major output language to the robot 631 based on the determined major output language.

In the example of FIG. 6, it is assumed that the weighted-sum language distribution information 620 indicates language distribution information in the area (or unit area) in which the robot 631 is deployed.

The AI server 200 may determine the language distribution in each unit area included in the control area 630 by receiving voice data from a plurality of robots included in the control area 630 and receiving event information 611 about the control area 630, determine the major output language for each unit area based on the determined language distribution, and transmit, to each robot, the control signal for setting the major output language corresponding to the deployment area.

Figure 7:
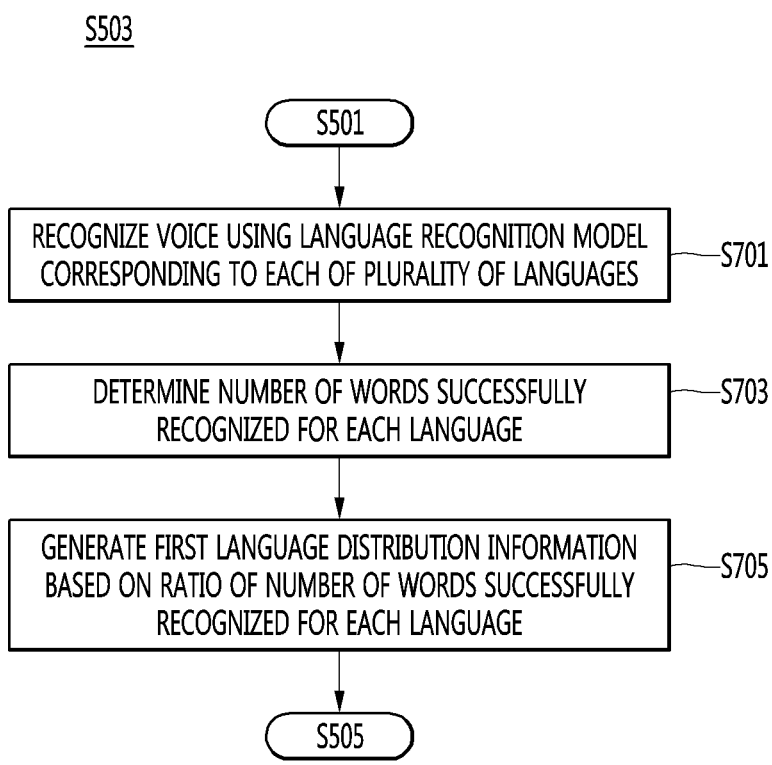
FIG. 7 is a flowchart illustrating an example of a step S503 of generating first language distribution information illustrated in FIG. 5.

FIG. 7 is a flowchart illustrating an example of a step S503 of generating first language distribution information illustrated in FIG. 5.

Referring to FIG. 7, the processor 260 of the AI server 200 recognizes voice using a language recognition model corresponding to each of a plurality of languages with respect to the received voice data (S701).

Here, the language model corresponding to each of the plurality of languages may be stored in the memory 230 or the model storage unit 231.

For example, if a Korean recognition model, an English recognition model, and a Japanese recognition model are stored in the memory 230, the processor 260 may recognize Korean using the Korean recognition model, recognize English using the English recognition model, and recognize Japanese using the Japanese recognition model, with respect to the received voice data.

The processor 260 of the AI server 200 determines the number of words successfully recognized for each language (S703).

Here, the processor 260 may determine the confidence level of voice recognition for each word, and determine that a word whose confidence level exceeds a second predetermined reference value is a successfully recognized word.

The processor 260 of the AI server 200 generates first language distribution information based on a ratio of the number of words successfully recognized for each language (S705).

The processor 260 may generate the first language distribution information as the number of words successfully recognized for each language or the ratio of the number of words successfully recognized for each language.

For example, as a result of attempting to perform voice recognition using a plurality of language recognition models with respect to specific voice data, if 30 words were successfully recognized by the Korean recognition model, 15 words were successfully recognized by the English recognition model, and 5 words were successfully recognized by the Japanese recognition model, the processor 260 may generate the first language distribution information as (Korean, English, Japanese)=(30, 15, 5) or (Korean, English, Japanese)=(0.6, 0.3, 0.1).

Here, the processor 260 may determine the number of words successfully recognized for a predetermined time, and generate first language distribution information based on the determined number of words.

For example, the processor 260 may determine the number of words for which voice recognition is successful for each language with respect to voice data for the most recent 10 seconds, and generate the first language distribution information based on the determined number of words.

Figure 8:
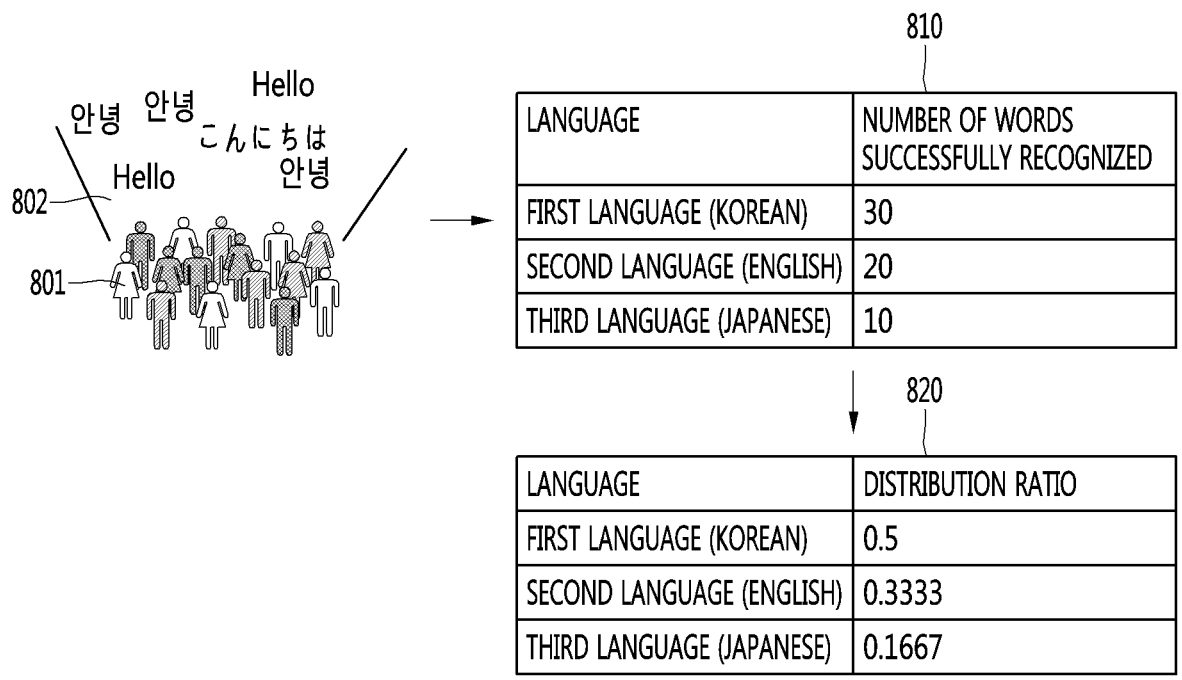
FIG. 8 is a view illustrating a method for generating first language distribution information according to an embodiment of the present invention.

FIG. 8 is a view illustrating a method for generating first language distribution information according to an embodiment of the present invention.

Referring to FIG. 8, the processor 260 of the AI server 200 may receive voice data for voice 802 of users 801 with respect to a control area.

The processor 260 may generate distribution information 810 of words succeeding in voice recognition for each language.

That is, the processor 260 may attempt to recognize the voice from the received voice data using a voice recognition model for a first language (Korean), and determine the number of words successfully recognized.

Similarly, the processor 260 may attempt to recognize the voice from the received voice data using the voice recognition model for the second language (English), and determine the number of words that have been successfully recognized.

Similarly, the processor 260 may attempt to recognize the voice from the received voice data using the voice recognition model for the third language (Japanese), and determine the number of words that have been successfully recognized.

For example, the distribution information 810 of the words that have succeeded in voice recognition may include information indicating that the words successfully recognized for the first language (Korean) are 30 words, the words successfully recognized for the second language (English) are 20 words, and the words successfully recognized for the third language (Japanese) are 10 words.

Then, the processor 260 may generate the first language distribution information 820 based on the distribution information 810 of the words successfully recognized.

That is, the processor 260 may determine the distribution ratio by dividing the number of words successfully recognized for each language by the total number of words successfully recognized by using the distribution information 810 of the words successfully recognized.

For example, the first language distribution information 820 may include information indicating that the distribution ratio for the first language (Korean) is 0.5, the distribution ratio for the second language (English) is 0.3333, and the distribution ratio for third language (Japanese) is 0.1667.

Figure 9:
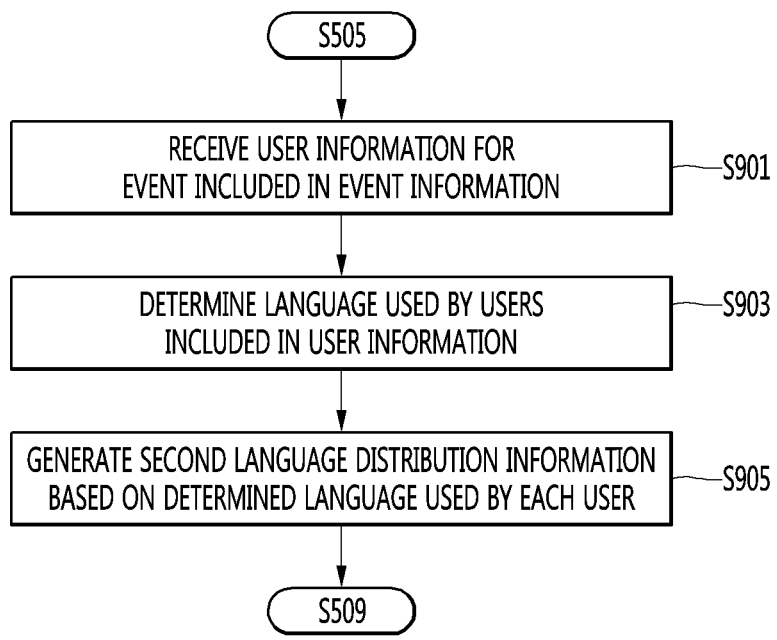
FIG. 9 is a flowchart illustrating an example of a step S507 of generating second language distribution information illustrated in FIG. 5.

FIG. 9 is a flowchart illustrating an example of a step S507 of generating second language distribution information illustrated in FIG. 5.

Referring to FIG. 9, the processor 260 of the AI server 200 receives user information for an event included in event information (S901).

The processor 260 may specify an event by using event identification information corresponding to the event included in the event information, and receive user information corresponding to the specified event.

Here, the event information may include information about a plurality of events, and the processor 260 may identify events included at a current time or for a predetermined period of time, and receive user information about the identified events.

For example, it is assumed that the control area is an airport, and the event information includes arrival information of 10 airplanes. In this case, the processor 260 may determine whether an airplane arrival event is present between 10 minutes before and after the current time by using the event information. If present, the processor 260 may receive user information for the event.

The processor 260 of the AI server 200 determines a language used by the users, which is included in the user information (S903).

As described above, the user information may include reservation information for the event or participation information for the event. Such the reservation information or the participation information may be computerized and managed, the processor 260 may obtain a variety of information about the subscriber or the participant from the user information.

Here, if the language information used by the user when the event is reserved exists in the user information, the processor 260 may determine the corresponding language as the language used by the user.

For example, if a specific user used an airplane reservation application to book an airplane and set the language of the airplane reservation application to Korean, the processor 260 may set the language used by the corresponding user to Korean.

Alternatively, if the user's nationality information is present in the user information, the processor 260 may determine the native language of the corresponding country as the language used by the user.

For example, if a specific user used an airplane booking application to book an airplane and the user information of the corresponding user includes information indicating that the nationality is the United States, the processor 260 may set the language used by the user to English.

Alternatively, the processor 260 may determine the user's language in consideration of the user's address information, the user's payment means information, the user's payment address information, and the like, which are included in the user information.

The processor 260 of the AI server 200 generates second language distribution information based on the determined language used by each user (S905).

Since the processor 260 determines the language used by each user in step S903, the processor 260 may generate second language distribution information based on the frequency of the languages used by the users.

Figure 10:
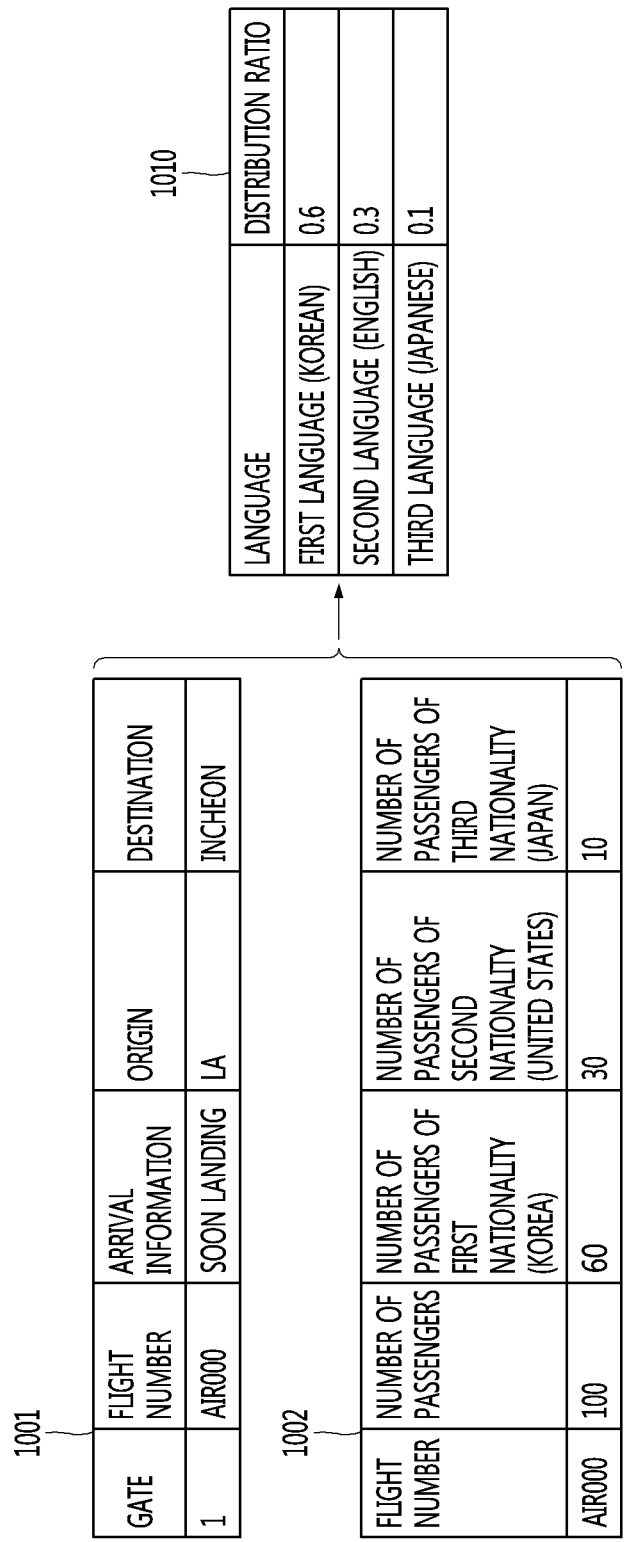
FIG. 10 is a view illustrating a method for generating second language distribution information according to an embodiment of the present invention.

FIG. 10 is a view illustrating a method for generating second language distribution information according to an embodiment of the present invention.

Referring to FIG. 10, the processor 260 of the AI server 200 may receive event information 1001 for a control area and user information 1002 for an event.

The user information 1002 for the event may be user information corresponding to the event identification information included in the event information 1001.

If the control area is an airport, the event information 1001 may include information about a gate, a flight number, arrival information, an origin, a destination, a departure time, and an arrival time. The user information 1002 for the event may include reservation information or passenger information for the flight number. In this case, information such as a gate, a flight number, an origin, and a destination may be used as event identification information.

For example, if the control area is Incheon International Airport, the event information 1001 may include information indicating that the flight number "AIR000" departing from LA lands on Gate 1 soon. The user information 1002 about the event may includes information indicating that a total of 100 people boarded the flight number "AIR000": 60 passengers of a first nationality (Korea), 30 passengers of a second nationality (United Sates), and 10 passengers of a third nationality (Japan).

The processor 260 may generate second language distribution information 1010 using the received event information 1001 and the received user information 1002.

Here, if the user information 1002 includes information about a specific passenger's nationality or language, the processor 260 may generate second language distribution information 1010 based on a nationality ratio of users or a ratio of languages used by the users.

For example, the second language distribution information 1010 may include information indicating that the distribution ratio for the first language (Korean) is 0.6, the distribution ratio for the second language (English) is 0.3, and the distribution ratio for third language (Japanese) is 0.1.

If the processor 260 does not receive the user information 1002 for the event and receives only the event information 1001, the processor 260 may determine the expected language distribution ratio based on statistical records and the like corresponding to the event information 1001.

For example, if the event information 1001 indicates that the flight "AIR000" from LA to Incheon will arrive soon, the processor 260 may estimate the ratio of the number of people who speak each language by using statistical information about the passengers of the airplane departing from LA and arriving at Incheon, and generate the second language distribution information 1010 based on the estimated ratio.

Meanwhile, in the above embodiment, although steps of FIG. 5 and steps of FIG. 7 are described as being performed by the AI server 200, but may be performed by any one AI robot 100 or 100a among a plurality of robots.

In this case, any one AI robot 100 may be a master robot that can control other robots, and the master robot may be a preset AI robot.

According to various embodiments of the present invention, by setting the languages often used by users as the major output language of the robot, it is possible to reduce a frequency at which a robot outputs languages rarely used by users, and it is possible to reduce the inconvenience of hearing a language that users cannot understand.

In addition, according to various embodiments of the present invention, languages used by non-speaking users can also be used as the major output language by determining the major output language in consideration of not only the distribution of the languages used while the real users utter but also the distribution of languages expected to be used by users considering events in a control area.

According to an embodiment of the present invention, the above-described method may be implemented as a processor-readable code in a medium where a program is recorded. Examples of a processor-readable medium may include read-only memory (ROM), random access memory (RAM), CD-ROM, a magnetic tape, a floppy disk, and an optical data storage device.

What is claimed is:

1. An artificial intelligence server for setting a language of a robot, comprising:
   a communication unit configured to communicate with the robot; and
   a processor configured to:
      receive voice data for a control area from the robot;
      generate first language distribution information using the received voice data;
      receive event information for the control area;
      generate second language distribution information using the received event information;
      determine at least one major output language for the robot based on the generated first language distribution information and the generated second language distribution information; and
      transmit a control signal for setting the determined major output language to the robot.

2. The artificial intelligence server according to claim 1, wherein the processor is configured to:
   recognize voice of the received voice data using a language recognition model corresponding to each of a plurality of languages;
   determine the number of words successfully recognized for each language; and
   generate first language distribution information based on a ratio of the number of words successfully recognized for each language.

3. The artificial intelligence server according to claim 2, wherein, when the processor recognizes the voice of the received voice data using the language recognition model, the processor is configured to:
   calculate a recognition confidence level for each word; and
   determine a word, of which the calculated recognition confidence level exceeds a first reference value, as the words successfully recognized.

4. The artificial intelligence server according to claim 3, wherein the language recognition model is a voice recognition model and is an artificial neural network-based model learned by using a machine learning algorithm or a deep learning algorithm.

5. The artificial intelligence server according to claim 1, wherein the event information is information for events related to the control area, and includes at least one of event identification information, event location information, event start time information, event end time information, event type information, or event delay information.

6. The artificial intelligence server according to claim 5, wherein the processor is configured to:
   receive user information for an event; and
   generate the second language distribution information using the event information and the user information,
   wherein the user information includes at least one of reservation information for the event or participation information for the event.

7. The artificial intelligence server according to claim 1, wherein the processor is configured to:
   generate a weighted-sum language distribution information by weighted-summing the generated first language distribution information and the generated second language distribution information; and
   determine the major output language based on a distribution value for each language in the weighted-sum language distribution information.

8. The artificial intelligence server according to claim 7, wherein the processor is configured to determine, as the major output language, a language in which the distribution value in the weighted-sum language distribution information exceeds a second reference value.

9. The artificial intelligence server according to claim 7, wherein the processor is configured to determine a predetermined number of languages as the major output language in descending order of the distribution value in the weighted-sum language distribution information.

10. The artificial intelligence server according to claim 1, wherein the control area is a maximum activity range of the at least one robot and includes a plurality of unit areas.

11. The artificial intelligence server according to claim 10, wherein the processor is configured to generate the first language distribution information for each unit area and the second language distribution information for each unit area.

12. The artificial intelligence server according to claim 11, wherein the processor is configured to:
   determine the at least one major output language for each unit area; and
   determine the major output language for the robot as the major output language determined for the unit area corresponding to a deployment area of the robot.

13. A method for setting a language of a robot, comprising:
   receiving voice data for a control area from the robot;
   generating first language distribution information using the received voice data;
   receiving event information for the control area;
   generating second language distribution information using the received event information;
   determining at least one major output language for the robot based on the generated first language distribution information and the generated second language distribution information; and
   transmitting a control signal for setting the determined major output language to the robot.

14. A recording medium having recorded thereon a program for performing a method for setting a language of a robot, the method comprising:

receiving voice data for a control area from the robot;
generating first language distribution information using the received voice data;
receiving event information for the control area;
generating second language distribution information using the received event information;
determining at least one major output language for the robot based on the generated first language distribution information and the generated second language distribution information; and
transmitting a control signal for setting the determined major output language to the robot.

\* \* \* \* \*